United States Patent [19]
Ricciardelli

[11] Patent Number: 5,566,890
[45] Date of Patent: Oct. 22, 1996

[54] PROCESS FOR RECOVERING POST-CONSUMER WASTE PLASTICS

[75] Inventor: Thomas E. Ricciardelli, Hingham, Mass.

[73] Assignee: Selectech, Incorporated, Hingham, Mass.

[21] Appl. No.: 395,819

[22] Filed: Feb. 28, 1995

[51] Int. Cl.⁶ .................................................. B02C 23/18
[52] U.S. Cl. .................... 241/20; 241/24.11; 241/33; 241/41; 241/DIG. 38
[58] Field of Search ................... 241/20, 24, 27, 241/41, 79.1, DIG. 38, 606, 24.11, 33

[56] References Cited

U.S. PATENT DOCUMENTS

| | | | |
|---|---|---|---|
| 3,926,379 | 12/1975 | Dryden et al. | 241/69 |
| 4,830,188 | 5/1989 | Hannigan et al. | 209/3 |
| 5,143,308 | 9/1992 | Hally et al. | 241/76 |
| 5,186,400 | 2/1993 | Ignjatovic et al. | 241/39 |
| 5,225,137 | 7/1993 | Sadr | 264/349 |
| 5,255,859 | 10/1993 | Peacock et al. | 241/79.1 |
| 5,289,978 | 3/1994 | Lundquist | 241/57 |
| 5,358,184 | 10/1994 | Skudrzyk | 241/16 |
| 5,375,778 | 12/1994 | Lundquist | 241/24 |

OTHER PUBLICATIONS

Advertisement, Systems, John Brown Recycling Systems (No Date Given).
Advertisement, Plastic Recycling, Refakt (No Date Given).
Advertisement, Washing Granulators, Herbold (No Date Given).
Advertisement, From This . . . To This . . . , M.A. Industries, Inc. (No Date Given).

*Primary Examiner*—John M. Husar
*Attorney, Agent, or Firm*—Roylance, Abrams, Berdo & Goodman, L.L.P.

[57] ABSTRACT

Feed stock is made from an assortment of post-consumer polymer articles by assembling those articles of the assortment which are suitable for recycling into feed stock. The assemblage is granulated into particles of a size suitable for feed stock. A detergent solution of predetermined concentration is formed for cleaning the granulated particles. The solution is added to the particles during the granulating step to mix the detergent solution with the articles to facilitate cleaning during granulating.

25 Claims, 3 Drawing Sheets

PROCESS FOR RECOVERING POST-CONSUMER WASTE PLASTICS

TECHNICAL FIELD

This invention relates generally to a new and improved process for recovering post-consumer polymeric waste articles, and more specifically, to a process for converting post-consumer high density polyethylene detergent containers into feed stock for subsequent usage. The subsequent usage typically entails utilizing the feed stock as a polymeric flake for molding into recycled plastic products.

BACKGROUND OF THE INVENTION

Prior art methods for recycling polymeric waste articles, such as post-consumer polymeric bottles, containers and the like, employ a succession of cleaning steps to remove solid and liquid waste residues adhering to the articles. The articles are typically fed to a mechanical granulator exemplified by rotating cutting or chopping blades housed in a chamber enclosure. The blades comminute the articles into particles, or "flakes", as such particles are commonly referred to. The flakes are generally rectangular wafers of about three-eighths of an inch on a side. The granulator chamber may include a water spray composed of a plurality of nozzles mounted in the chamber and oriented to direct the spray to onto the cutting blades during comminution. These types of granulators are commonly referred to as a "wet" granulators to distinguish such from "dry" granulators that do not utilize water sprays or, for that matter, any liquid whatsoever during the granulation process. The nozzles of wet granulators typically receive clean water from a suitable source. In wet granulaters, the water spray obviously also assists ha removing some of the solid and liquid contaminants adhering to the articles. The solid contaminants include paper labels as well as dirt and food particles, whereas liquid contaminants include soap residues and oils. However, oftentimes significant amounts of solid and liquid contaminants are not able to be removed by the clean water spray and thus the flake which is produced by the granulator is not clean enough for use in an injection molding machine. To remove a sufficient amount of the solid and liquid contaminants from the plastic flakes for such usage, the prior art processes typically employ several repetitive steps of washing and rinsing the flakes with clean water following granulation. As will be appreciated, if the number of times the flakes are required to be washed and rinsed during the recycling process could be reduced while nonetheless yielding a sufficiently clean flake for end-use requirements, the recycling process would require less clean water and otherwise be more resource-conserving and efficient.

It is an object of this invention to provide an efficient, natural resource-conserving process and apparatus for converting post-consumer polymeric waste articles into feed stock suitable for recycling.

Another object of this invention is to provide a new and improved process for granulating recyclable containers in a wet granulator system.

Another object is to provide a recycling process wherein post-consumer detergent residues are used to increase the cleaning effectiveness of a wet granulator.

Still another object is to provide an efficient and water-conserving method for processing of post-consumer, high density, polyethylene detergent containers into particulate feed stock for injection molding.

Yet another object is to provide a new and improved wet-granulator in which a detergent of controlled concentration is sprayed into the granulator to enhance cleaning during granulation.

SUMMARY OF THE INVENTION

In accordance with one aspect of this invention, an assortment of post-consumer polymeric articles are chopped to the desired particulate size in a wet granulator having a spray system comprised of a plurality of water spray nozzles from which water solution flows to facilitate granulation in the cutting chamber. The particles from the granulator are conveyed through at least one subsequent washing and rinsing station. A portion of the water drained from this rinsing station is re-circulated back to the spray nozzles and added as a liquid constituent to the clean water normally fed to the spray nozzles. The clean water may be heated to enchance the cleaning action of the spray. The amount of clean water normally required in the wet granulator is advantageously reduced in proportion to the amount of the re-circulated rinse water mixed with the fresh water and fed to the spray head as the liquid cleaning solution. This detergent-rich solution impacts the containers and chopped particles and increases the capability of the granulator to remove foreign contaminants from the containers during the granulation process. Moreover, the re-circulated rinse water allows an opportunity to control the detergent concentration of the spray.

Post-consumer detergent bottles may be advantageously used as a source of detergent. The residual detergent commonly found in such bottles is mixed with the fresh water in the granulator, stored, and re-circulated as a constituent for the spray used to wash the articles during granulation.

The re-circulation of this detergent-containing rinse to the granulator spray nozzles increases the effectiveness of the sprays to remove contaminants during granulation and importantly, reduces the volume of fresh water. The concentration of detergent in the re-circulated solution may be monitored by pH level to achieve the optimum mixture of fresh and detergent solution. Moreover, by admixing the rinse water with heated clean water or by heating the rinse water directly, the cleaning effectiveness of the spray is enhanced.

BRIEF DESCRIPTION OF THE DRAWING

The invention will be more fully understood from the following detailed descriptions of an illustrative embodiment taken in connection with the appended figures in which.

DETAILED DESCRIPTION

Figure 1:
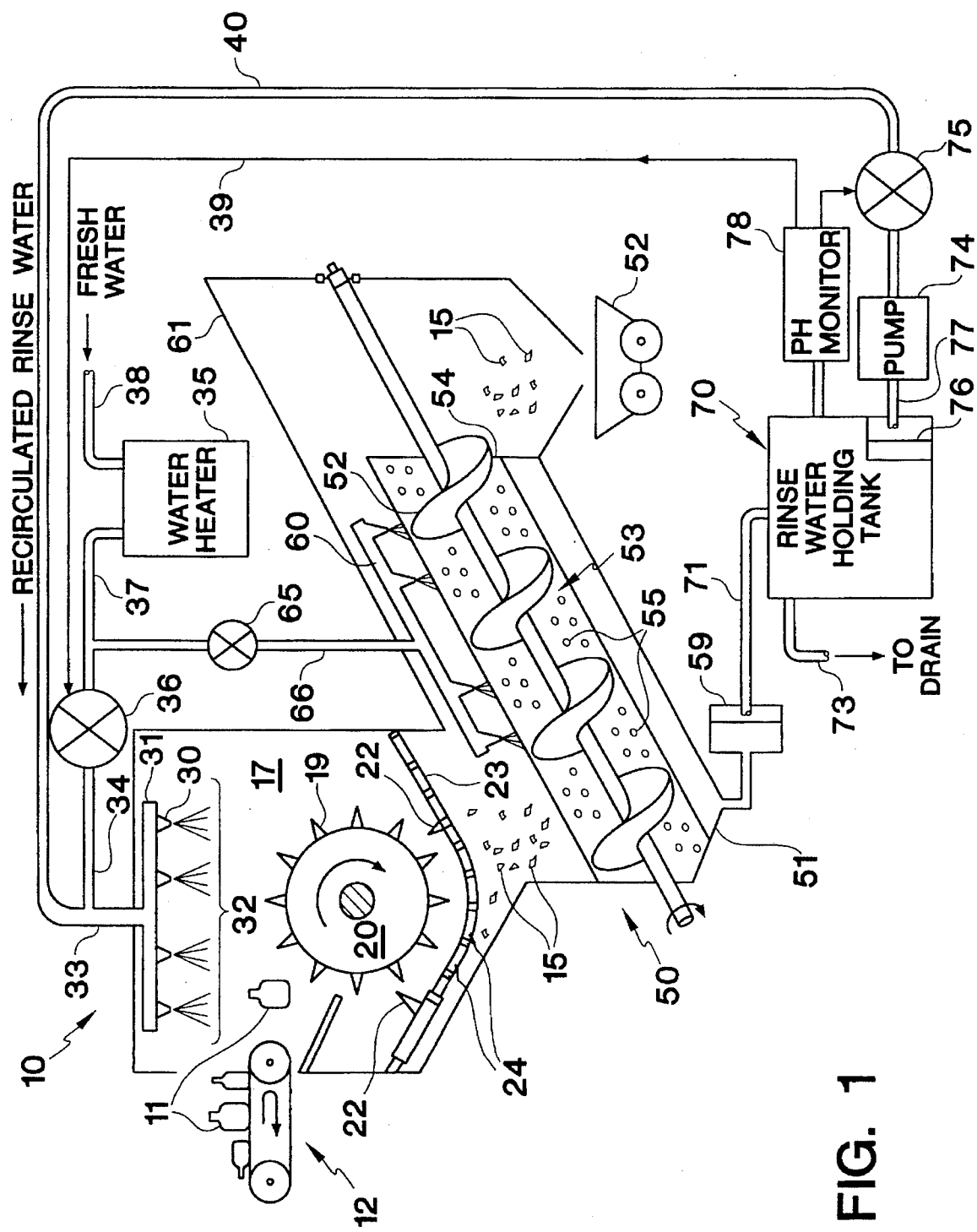
FIG. 1 illustrates an apparatus which performs the process of the instant invention.

Referring to FIG. 1, the apparatus 10 processes plastic containers 11 of recyclable polymeric material. The containers 11 are fed into a wet granulator 14 by a conveyor 12 where they are chopped in the presence of hot water to particles 15 of desired dimensions, for example, three-eighths of an inch on each side.

The granulator 14 is designed to simultaneously chop and wash the plastic containers 11 which are fed into its comminuting chamber 17 which is accessible from an open side 18 in the granulator. As exemplary of a suitable basic granulator is the Model G2030 heavy duty wet granulator manufactured by Nehnor Co., Inc. of North Uxbridge, Mass. The chamber 17 contains a plurality of radially projecting shearing bars or blades 19 which are fixedly mounted on a rotating rotor 20 which typically rotates in the chamber 17 at approximately 500 rpm. The blades 19 extend substantially parallel to the axis of rotation of the rotor 20. As the blades 19 rotate, they pass, with close tolerance, a second set of one or more shearing bars or blades 22 that are fixedly mounted within the chamber 17 and extend substantially parallel to the rotor axis and hence to the blades 19. The plastic containers in the chamber are caught between the moving blades 19 and the fixed blades 22 and are cut into small particles. As will be apparent, other types of granulators may be used to effect the comminution of the bottles into flake.

A steel screen 23 is fixedly positioned under the rotor 20 and in close tangential relation to the rotating blades 19. The separator screen 23 has holes 24 extending throughout and in the exemplary case where the particles 15 are to be cut into three-eighths of an inch size, the screen holes 24 are selected to be slightly greater than three-eighths of an inch in diameter, for instance one-half of an inch. The cutting continues until the plastic particles are reduced to a small enough size to fall by gravity through the screen holes 24 to the bottom 26 of the cutting chamber 17 for further treatment as described hereinafter.

A plurality of water spray nozzles 30, typically, four to six in number, are mounted on a common overhead pipe 31 to form a multi-orifice spray head 32. The spray head 32 is fixedly mounted within the chamber 17 above the rotating blades and the open side 18 and water sprays water into the chamber continuously during granulation from the multiple number of orifices or nozzles. This water impacts the plastic to wash out dirt and other foreign matter which is soluble in water. The chopping of the bottles exposes their residues to the water solution and the agitation facilitates the dispersal of the residue into the water. Thus, the high speed rotation of the blades 19 and rotor 20 produce severe agitation to effect a washing of the plastic. The agitation also removes and pulverizes paper labels for subsequent separation from the plastic particles.

In the case where the plastic containers are post-consumer detergent bottles, it is common for such bottles to contain some residue of detergent even though they may have been rinsed by the consumer prior to their collection for recycling. Prior art granulating processes of which I am aware, typically employed clean water in the chamber 17 which mixes with whatever minimal detergent residue remains on the bottles as they are chopped, and the minimal detergent-containing solution is quickly flushed through the screen 23 and from the granulator chamber 17. Thus, the residual detergent on such bottles does not have sufficient opportunity to participate to any significant extent in cleaning during granulation and the concentration of the detergent is neither high nor controlled in accordance with prior art wet granulator systems.

In accordance with this invention, the spray nozzles are led a detergent mixture of controlled concentration to enchance initial washing of the articles as they drop into the granulator and while they are subsequently comminuted. This detergent solution is preferably obtained from the wash water produced during successive granulations of detergent bottles and the detergent concentration is monitored and controlled for optimum cleaning of the articles. To effect this result, the spray head 32 is supplied with water obtained from two different sources, both coupled to a common water conduit or pipe 33 which forms the vertical leg of a "T" connection for the head 32 through which admixtures of clean and detergent-rich rinse water flow to the spray head 32. The first water source is supplied to the head 32 through a water pipe 34 connected to the outflow of a conventional water heater 35 receiving cold water from input water pipe 38. The heater 35 produces clean (detergent-free) water heated to between 150° F. and 180° F. and supplies this water to output pipe 34 by way of a flow control valve 36. The valve 36 may be controlled by a monitor receiving control signals from conductor 39, or alternatively, may be of a manually controllable type; but in either case, functions to control the rate of flow of water through the pipe 34. Typically the valve rotates in one direction in response to a signal of positive polarity and in a reverse direction in response to a signal of negative polarity. The pressure in this pipe is typically maintained at a relatively high magnitude, for example, 60 psi. The second source is a re-circulating subsystem comprised of a water conduit or pipe 40 which supplies the pipe 33 and hence the head 32 with a re-circulated detergent solution. This solution may be obtained from successive processes of granulating detergent bottles in the presence of the water from the head 32, as will be described hereinafter. The mixing of hot clean water from the pipe 34 and the detergent-rich rinse water from the pipe 40 occurs at the junction with pipe 33 and the resulting heated, detergent-rich mixture is fed to the nozzles 30 under relatively high pressure.

The lower end 26 of the granulator 14 is mounted immediately above the downstream end of de-watering/rinsing conveyor 50 so that the particles 15 falling through the separator screen 23 are conveyed upwardly by the conveyor 50 from the upstream end. The conveyor 50 includes a screw auger 52 which rotates immediately above and in near contact with a foraminus separator screen 53, as illustrated. The auger 52, which is typically 10-inches in diameter, axially conveys solid material received at its downstream end 51 to its upstream end 54 and in the process, de-waters the particles as they are moved upwardly across the semen 53. The screen 53 is formed from a metal trough of semi-circular cross-sectional shape and is made foraminus by a multiplicity of holes 55. The holes 55 are of a considerably smaller size than the holes in the screen 23 in granulator, and in the particular example given above, are one-eighth of an inch in diameter, to allow the spray water to flow freely from the plastic flakes while still preventing the flakes from passing through the screen. The screen trough 53 and auger 52 are themselves mounted within an enclosed trough of semi-circular cross-section which captures and directs the gravity flow of drained rinse water to downstream end 51. The flakes 15 which are advanced upstream ultimately drop off through end 54 and fall by gravity into a suitable receptacle, conveyor, or bin 62 for subsequent use as feed stock.

The flakes 15 may be additionally rinsed by water from a plurality of spray nozzles 60 mounted on the cover 61 of the conveyor 50 so as to direct their water sprays toward the screen 53. The spray serves to rinse out may remaining detergents, pulverized paper labels, and other contaminants. The water for this spray rinse may be obtained from the heater 35, through a flow control valve 65 mounted in a pipe 66 receiving water from the output pipe 37 of heater 35. The valve 65 may be a conventional manually adjustable water flow control valve or may be controlled by a motor receiving control signal from conductor 39. The water from the conveyor 50 is gravity fed from end 51 to holding tank 70 by way of a conduit or pipe 71. A filter 59 removes solid particles from the flow in the pipe 71. The holding tank has a pumping system 74 and an overflow system, the former pumps a portion of the rinse water back into the granulator while the latter is positioned in the tank at a level which allows the other portion to flow through an outlet pipe 73 into a drain for disposal, as illustrated. Re-circulation of rinse water by way of the pumping system reduces the total fresh water demand of the process. Disposal of a fraction of the water the tank 70, by way of the pipe 73, allows for the disposal of detergent so that the volume of the recirculated rinse can be controlled.

As shown in FIG. 1, an electrically-powered water pump 74 receives rinse water from the tank 70 by way of a filter 76 and connecting conduit or pipe 77. A pH monitor 78 samples the pH of the rinse water in the tank 70 and through operation of valve 75 in the, pipe 77 provides the optimum flow rate in the pipe 40 in accordance with a mass balance calculation described with reference to FIG. 2, effects a desired pH balance between recirculated detergent flowage in pipe 40 and flowage of fresh water in pipe 34.

The process of this invention actually increases the amount of detergent that is available during the granulating stage and provides a mechanism to control this level. The detergent level within the granulator can be controlled by controlling the respective volume and flow rate of fresh water fed to the granulator and the volume and flow rate of the detergent-rich rinse fed back to the granulator.

The detergents that are mixed with the feed plastic have a high pH. As they mix with the water within the system, they correspondingly raise the pH of the water. Thus, by measuring the pH of the water within the system, one can gauge the level of detergent that is present in the system.

Figure 2:
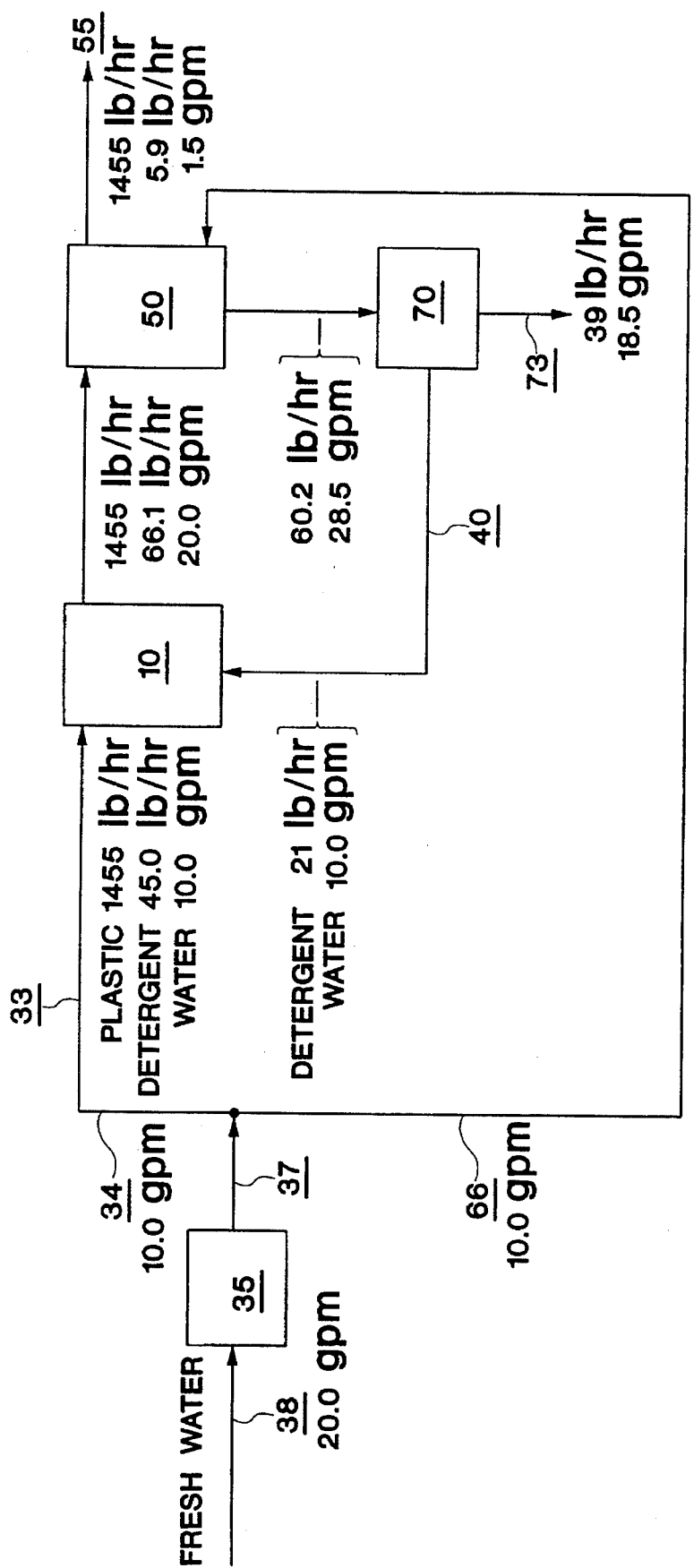
FIG. 2 illustrates a flow diagram showing exemplary values for the plastic, water, and detergent at different stages of the process.

FIG. 2 depicts the mass balance calculation for the water and detergent flows within the system. At assumed operating conditions of 3% by weight of detergent in articles 11, 50% by weight of water carryover with the plastic from stage to stage resulting from water that clings to the plastic via surface tension, and further assuming that 75% of the detergent on the plastic dissolves into the water in the granulator, the detergent concentration is reduced from 45 pounds per 1,500 pounds of feed to under 6 pound per 1500 pounds of feed with one stage of rinsing. Additional rinsing stages can be added to further reduce the amount of residual detergent remaining with the end-product received by means 62.

Water from the rinse stage 50 is returned to the granulator stage 10 thereby reducing the total water demand while still cleaning the plastic. In the granulator 10, the re-circulation of water reduces total water demand and actually increases the pounds of detergent per pound of plastic during this critical washing stage. The rinsing stage then quickly rinses out this detergent bringing the final detergent level to within the desired specification.

In accordance with one embodiment of the invention, the above listed control parameters can be automatically controlled by measuring the pH in the holding tank 70 and feeding a variable amperage signal back to control circuitry with then applies the appropriate voltage polarity (positive or negative relative to ground potential) to control valves 36 and 75 to automatically increase or decrease the feedback water flow rate as required. Since the detergents are caustic (they have a measurably high pH value), the concentration of detergent can be measured by the pH of the solution. Thus, if the pH in the holding tank 70 is too high, the system has too much detergent in it. The pH level in this tank is preferably between 10 and 11. A pH monitor 78 measures the pH and generates the amperage signals sent to control the open and closed states of the valves 36 and 75. The valves 36 and 75 operate in opposition to one another because valve 36 controls the flowage of fresh water into the granulator while valve 75 controls the flowage of recirculated rinse water. Thus, assuming that the pump 74 operates at a constant speed, if the pH in the system is measured above 11, the monitor 78 sends a signal to the valve 36 which causes the valve 36 to open further and increase the flow rate of clean water into the system. The monitor also sends a signal to valve 75 causing it to close and reduce the flow rate of rinse water back to the granulator. If the pH is measured below 10, the monitor 78 sends a signal the valve 36 to causes valve closure thereby reducing the flow rate of clean water into the system, and simultaneously sends a signal to valve 75 which causes it to open further and increase the flow rate of recirculated rinse water until the system stabilizes at the desired level of pH concentration. Alternatively, the pH may be visually monitored in the tank and the flow control valves manually adjusted, as described above, to control the pH level, or the pump 74 may use a variable speed drive controlled by the output of the monitor 78 to achieve variation in the flow rates dispensing with valve 75.

Figure 3:
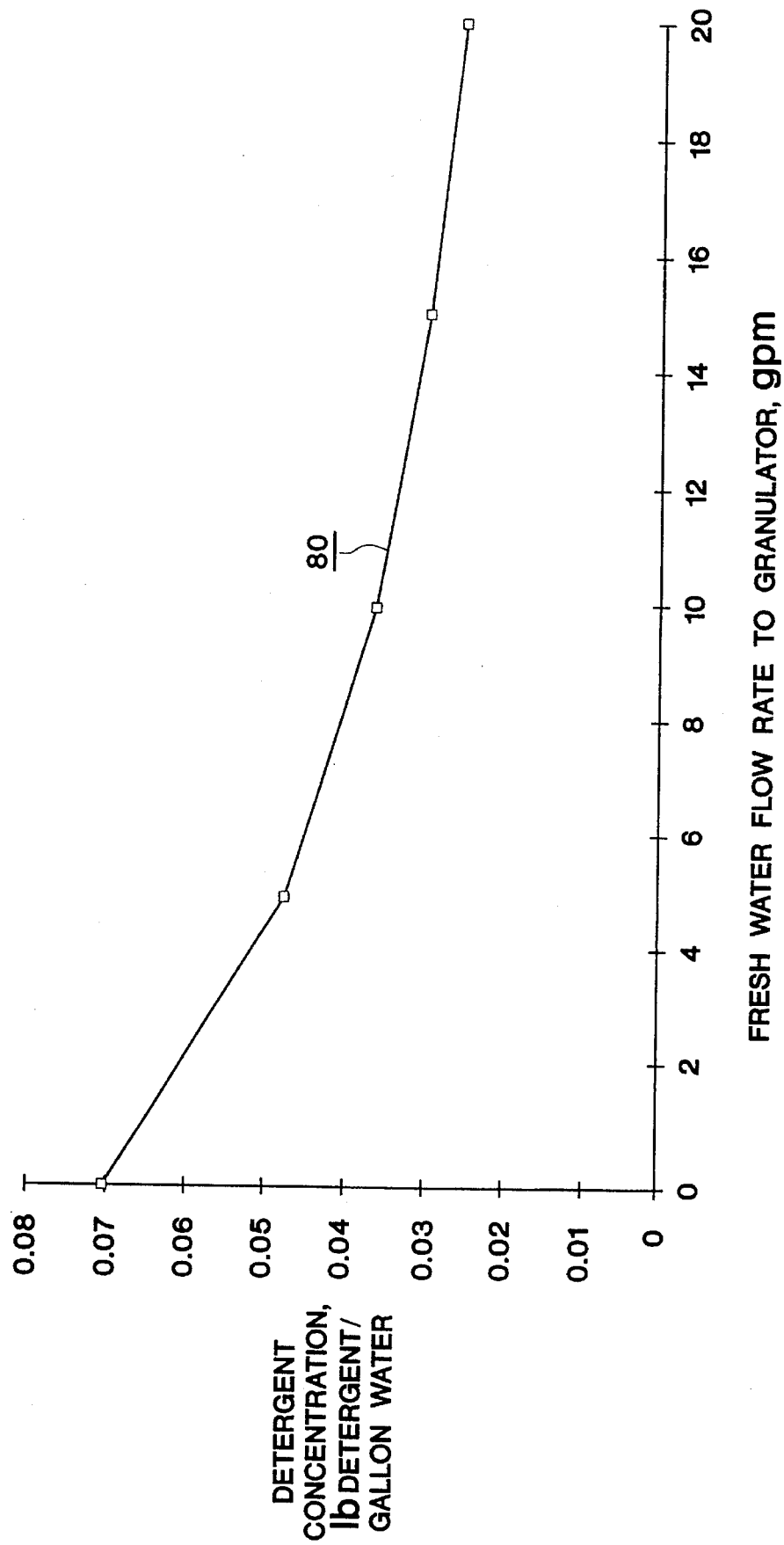
FIG. 3 is a graphical depiction showing the effect of water flow rates on detergent concentration.

FIG. 3 illustrates by means of graph 80 that the concentration of detergent in the holding tank 70 will vary as a function of water teed flow rates. Graph 80 is plotted on the previously assumed conditions that the detergent on the feed articles 11 is present at 3% by weight, that 75% of the detergent is rinsed from the plastic in both the granulator 10 and the de-watering/rinsing conveyor 50, that an amount of water equal to 50% of the weight of the plastic remains with the plastic and is carried to the next stage, that the flow rate of fresh water to the rinsing stage is kept at 10 gallons per minute, and that the total flow rate (fresh water plus m-circulation water) to the granulator is kept at 20 gallons per minute. Graph 80 illustrates that as the flow rate of water is increased to the granulator 10, the concentration of detergent in the holding tank 70 will fall. Thus, the flow rate of water can be adjusted in response to the pH as described above to yield the desired concentration of detergent throughout the system.

Although the invention has been described with reference to preferred embodiments described herein, it is noted that substitutions may be made and equivalents employed herein without departing from the scope of the invention as defined in the claims. For example, the granulator spray may be supplied with a detergent solution of predetermined concentration obtained from a non-recirculated source, such as a supply tank independent of the conveyor, containing a detergent solution and connected by the conduit 33 to the spray head 31.

What is claimed is:

1. A process for making polymeric feed stock from an assortment of post-consumer polymer articles comprising the steps of: assembling those articles of the assortment which are suitable for recycling into feed stock; feeding a succession of the articles to a granulator for successive granulations, granulating the articles into particles of size suitable for feed stock, forming a detergent solution of predetermined detergent concentration by admixing controlled amounts of clean water and detergent of sufficient quantity for cleaning the granulated particles, applying said solution to the articles during the of granulating, whereby the detergent solution mixes with the articles as the articles are being granulated to facilitate the cleaning and granulating thereof, recovering at least part of the solution from a granulating step, using at least some of the recovered solution in forming the detergent solution for reuse in a subsequent granulating step, monitoring the detergent concentration of the recovered solution for reuse in said subsequent granulating step, and adjusting the relative amounts of fresh water, detergent, or both in the mixture of the reused detergent solution as needed to maintain the predetermined concentration, and applying at least some of the reused solution to the articles during said subsequent granulating step.

2. The process according to claim 1 wherein the step of applying detergent solution comprises, spraying the solution by spraying means onto the articles during a succession of subsequent granulating steps.

3. The process according to claim 1 wherein selecting as an article of the assemblage at least one post-consumer detergent container having residual detergent therein, whereby said step of granulating the container releases the detergent to the recovered solution, whereby the released detergent provides at least an amount of the reused detergent solution.

4. The process according to claim 1 and further comprising the steps of conveying the particles from said granulating steps, and at least partially removing the detergent solution from the conveyed particles, and storing the solution as part of the solution recovering step.

5. The process according to claim 4 and further comprising; re-circulating at least part of the removed solution to said spraying means, whereby the removed solution is fed back to the spraying means.

6. The process according to claim 5 and further comprising the step of; providing a controlled amount of clean, hot water, and mixing said hot water with the recirculated solution to provide a predetermined concentration of hot, detergent solution to said spraying means.

7. The process according claim 6 and further comprising, measuring the pH of the recovered solution as an indicator of detergent concentration during the storage of said recovered solution, and adjusting the pH of said recovered solution by adding thereto a controlled amount of clean, hot water to provide a predetermined pH of hot, detergent solution for said reuse.

8. The process according to claim 4 and further comprising the steps of; rinsing the particles with water during said step of conveying to facilitate particle cleaning; and adding the rinse water to the recirculated solution fed to said spraying means.

9. The process according to claim 8 and further comprising the step of separating the conveyed particles from foreign matter of greater density in a separating means.

10. The process according to claim 9 wherein the step of separating is done in a gravity separating means containing water as the separating medium.

11. The process according to claim 10 wherein water from the separating means is recirculated for said rinsing of the particles during said step of conveying.

12. The process according to claim 10 which further comprises the steps of conveying the particles from said separating means to a dryer wherein the particles are dried.

13. The process according to claim 9 which further comprises the steps of: conveying the particles from the separating means, and removing and storing at least part of the solution from the conveyed particles.

14. The process according to claim 13 and further comprising; re-circulating at least part of the removed solution to the separating means to provide a water flow through the separating means.

15. The process according to claim 13 and further comprising the steps of; rinsing the particles with water during said step of conveying to facilitate particle cleaning; and adding the rinse water to the recirculated solution.

16. The process according to claim 13 wherein the step of removing comprises; draining the solution from the particles by means of a de-watering conveyor, and wherein the step of storing includes the step of feeding the drained solution to a holding tank.

17. The process according to claim 16 and further comprising the step of adding an anti-foaming agent to the solution in the holding tank.

18. The process according the claim 16 and further comprising the steps of; monitoring the pH of the solution in the holding tank as an indicator of detergent concentration, and adjusting the pH of said solution by mixing a controlled amount of clean, hot water to said solution to provide a predetermined pH of hot, detergent solution to said spraying means.

19. The process according to claim 16 and further comprising the steps of; discharging a non-recirculated amount of the solution; and, filtering foreign solid matter prior to the discharging of the solution.

20. The process according to claim 16 wherein the granulated particles are comminuted by each granulating step to a size of approximately one-half inch in length.

21. The process according to claim 4 wherein the step of removing comprises draining the solution from the particles by means of a de-watering conveyor, and wherein the step of storing includes the step of feeding the drained solution to a holding tank.

22. The process according to claim 4 wherein said step of conveying is done by means of a de-watering conveyor; and, wherein the granulated particles are of approximately one-half inch in length.

23. In a continuous granulating process for converting recyclable polymer containers into feed stock, the steps comprising: mixing the containers with one or more post-consumer, recyclable detergent containers of polymeric material, each said detergent container having at least a residual amount of a detergent, spraying an aqueous solution containing a fresh water component on the containers to facilitate cleaning and granulation thereof, recovering said aqueous solution containing a detergent component resulting from said cleaning and granulation step, measuring the detergent concentration of the recovered aqueous solutions, providing a fresh water component as necessary to achieve the desired detergent concentration, mixing the fresh water component and the recovered solution prior to a subsequent step of spraying whereby a solution with predetermined detergent concentration is used in the subsequent spraying step.

24. A wet granulating system comprising: a cutting chamber having a fluid input and fluid output for comminuting articles into particulate size, a source of fresh water and a source of soluble detergent, a spray head mounted at said input end of said chamber for directing a liquid spray into the chamber during comminution, a fluid recovery apparatus coupled to said output end of said chamber for recovering the detergent used during comminution, a detergent monitoring means coupled to said recovery apparatus for monitoring the detergent concentration of the liquid spray, a control means coupled to said monitoring means and to the water and detergent component sources and responsive to the monitoring means for feeding a detergent solution, which includes at least some recovered detergent, back to said spray head, whereby particulate cleaning is effected by said solution during comminution.

25. The granulator according to claim 24 and further comprising, a liquid heating means for heating the solution before feeding such to said spray head.

* * * * *